July 27, 1965  F. A. MURPHY  3,197,160
METHOD OF MAKING SCREEN
Filed Sept. 6, 1961  3 Sheets-Sheet 1
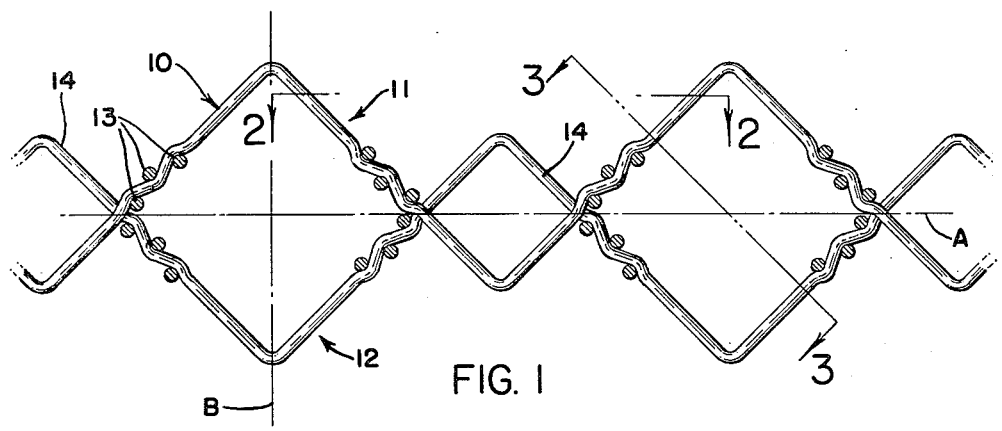
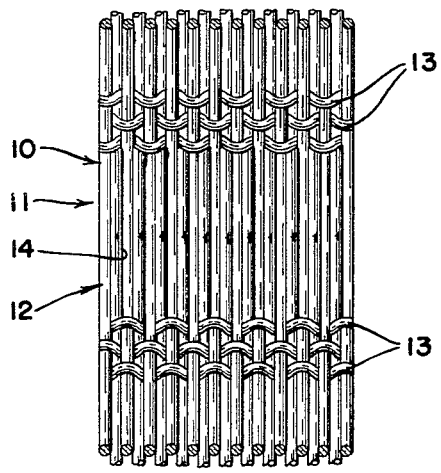
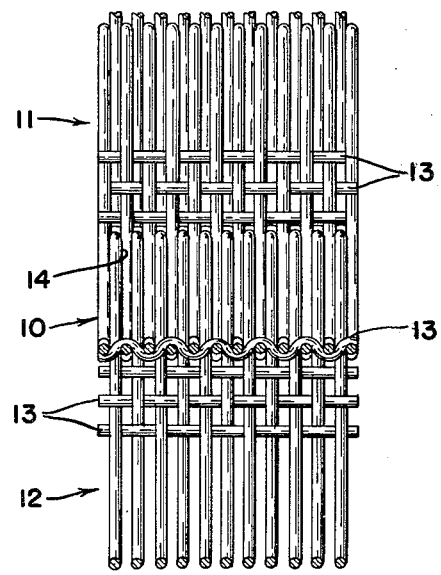
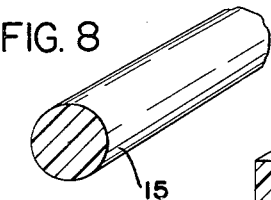
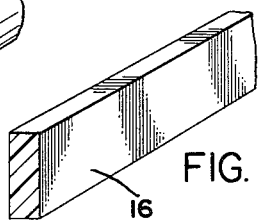
INVENTOR.
FRANCIS A. MURPHY
BY
*Fay & Fay*
ATTORNEYS July 27, 1965  F. A. MURPHY  3,197,160
METHOD OF MAKING SCREEN
Filed Sept. 6, 1961  3 Sheets-Sheet 2

INVENTOR.
FRANCIS A. MURPHY
BY
*Fay & Fay*
ATTORNEYS

INVENTOR
FRANCIS A. MURPHY
BY
*Fay & Fay*
ATTORNEYS 3,197,160
METHOD OF MAKING SCREEN
Francis A. Murphy, Rocky River, Ohio, assignor to W. S. Tyler, Incorporated, a corporation of Ohio
Filed Sept. 6, 1961, Ser. No. 136,344
4 Claims. (Cl. 245—2)

This invention relating as indicated to screens or recurring pattern stock material is particularly directed to a mechanical configuration of woven wire material and to a screen device adapted to be put together in a fairly sturdy construction to produce a new and improved combination useful in connection with light transmission and air diffusion but also having utility as a structral member or as a flooring member.

This invention relates to a particular screen combination of longitudinal and cross strands, some of which strands are rigidly held against longitudinal movement, whereby the screens may be formed with a multiplicity of longitudinal undulations and because of substantially similar conformations and wire spacing in an adjacent member, which is also formed with a number of undulations, the two members together make a screen device having at least two plane surfaces generally parallel to one another which surfaces may be useful as a structural member having self-supporting characteristics not only as ceiling members for light transmission but also in connection with flooring and wall panels.

This invention is particularly directed to a screen device particularly a woven wire screen, and to a combination having a variety of uses about to be more fully explained. Generally, in connection with light transmission units, various types of woven and formed materials are used for light diffusers. These units must have a variety of characteristics since some of them are chosen for their decorative quality, others are chosen for their mechanical configuration involving light reflectivity, transmission of light and diffusion of air. These units must also have some structural strength and it is desired in this invention to develop a simple improved screen device having superior characteristics.

It is generally to be noted that a new structural screen material, possibly a floor or wall panel material, may be characterized as having limited rigidity because the screen strands are substantially in one plane. However, in this invention, two screens having alternate undulations are secured together so that they produce a reinforced box-like structure having improved light and air diffusion characteristics and improved ability to withstand loading.

An object of this invention is to provide a new and improved combination of screen materials for both light and air diffusion as well as for structural panel use.

A further object of this invention is to provide a new and improved combination of a light and air screen diffuser characterized by its inherent strength together with good light reflectivity characteristics and by multiplicity of strands substantially parallel to one another and spaced from one another which produce characteristics of air diffusion as well as light diffusion and also produce a contrasting pattern of shadows which change as one moves underneath the screen with light behind it, much in the manner of a "Lunimeter."

A further object of this invention is to produce a new and improved structural element involving at least two undulating surfaces of relatively strong woven material in which the cross strands are firmly attached to the element at spaced intervals along the element, said woven material being generally undulating in various conformations to produce the desired result and having substantially similar spacing so that when two of these woven materials are interlaced, they will produce two surfaces undulating back and forth in each other having cross strands fixed to longitudinal strands to find supportable points within the woven material. These surfaces may be fastened by various means whereby a new and improved structural panel is produced of enhanced characteristics in terms of structural strength, rigidity and the like.

To the accomplishment of the foregoing and related ends, said invention, then, consists of the means hereinafter fully described and particularly pointed out in the claims; the following description setting forth in detail one approved means of carrying out the invention, such disclosed means, however, constituting but one of the various ways in which the principles of the invention may be used.

In the drawings:

FIG. 1 is a cross-sectional view of a panel of this invention;

FIG. 2 is a plan view of said panel taken on line 2—2 of FIG. 1;

FIG. 3 is a plan view on line 3—3 of FIG. 1;

FIG. 8 and 9 are detached prespectives of the reinforcing rods; and

Figure 4:
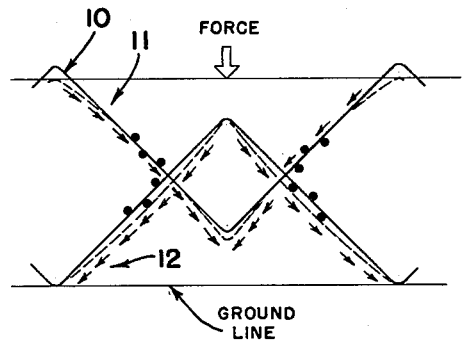
FIG. 4 is a schematic view of one of said panels in a line loaded condition and in cross-section showing a force diagram of the forces involved in said loading.
Figure 5:
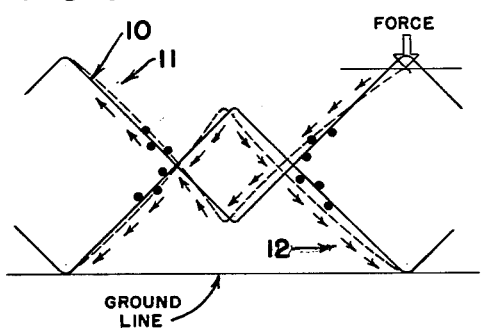
FIG. 5 is a further view of one of said panels in a point loaded condition.

In the drawings, FIG. 1 shows a cross-sectional view of the screen, a typical strand is shown at 10 in the drawings and this would be undulated in a special form, possibly in a hexagonal or a square form, or a combination of these, or showing rounded conformations in oval or combinations of ovals and squares or others. The two part screen assembly is indicated generally at 11 and 12. One screen would be in one form and the other screen layer would be in the same or some other form. This produces alternating characteristics of geometric sections which project from one side of the screen to the other side. The intersection of the two screens 11 and 12 is marked by cross strands 13 which generally are in units of two or three. In a typical example, they are formed in a manner identifying a long slot 14, i.e. there is a long slot between one strand arbitrarily chosen as the longitudinal strand and the cross strand. The cross strands 13 are locked by means of manipulative technique on the wires 10 so that they will not move longitudinally along the strands.

By this means pressure on the formed longitudinal strands 10 can be transmitted along the members which are semi-rigid or rigid to the cross strands 13 and since these are locked in connection with the longitudinal strands, they will transmit pressure through to the other screen and form a sandwich arrangement which will be a box-like structure having some ability to withstand deformation and, at the same time, be capable of resisting compression. The box-like structure and the forming means between the two undulated screen sections 11 and 12 will produce a fairly rigid structure.

By a careful selection of the screen strands 10, it is possible to produce a section which has reasonably good compression resistance, substantial bending ability and other characteristics as desired. The undulated conformations can be substantially flat along one surface for an interval or can be round or can have other configurations. Suffice it to say, that the strands must be at approximately the same spacing, i.e. woven screen cloth having so many wires per inch with uniform spacing between the wires is preferred though it could be realized that they could be of a similar woven structure and varying spacing. In this event, it would still be mutually supporting and the bent or undulated portions of one strand would fit along and be adjacent to the other strands so the two sections 11 and 12 would go together and project through the long slots 14 and be fastened by the secured cross strands 13 so that they will accept loads and bending moments therebetween. It is generally desirable to have the undulations of each strand lying in a single plane.

Figure 6:
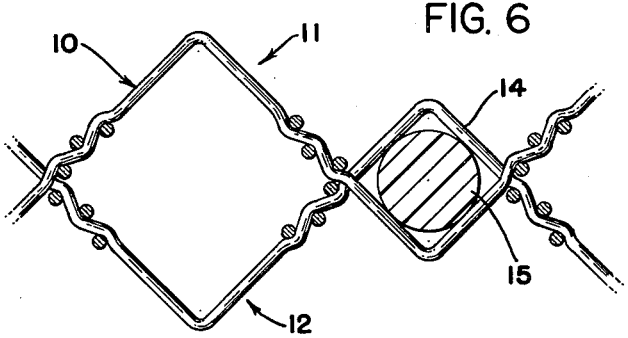
FIGS. 6 and 7 show a cross-sectional view of a modified form of said panel showing different support elements across the panel.
Figure 7:
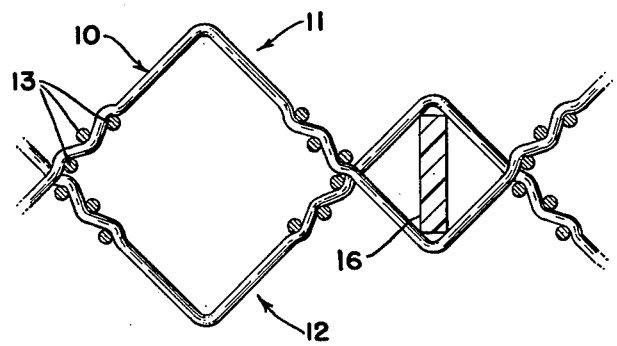

Various types of reinforcing means such as shown at 15 in FIG. 6 and at 16 in FIG. 7 may be employed. These may consist of welding the strands together or by fastening by other means and/or such as metal fasteners and the like. The strands can be of any thickness or rigidity and any metal surface that can be woven and this involves a great variety of metals and a great variety of finishes.

In general, common characteristics of the screens are that they must be woven at substantially similar spacing, that they be formed with one or more cross strands 13, generally 2, 3, or 4, so that the cross strands are secured in their spacing with respect to the longitudinal strands 10 so that at the intersection of the longitudinal strands as they are undulated and bent through, there will be some resistance to movement so that the structure will not be "sleazy" and will have a reproducible pattern thereto. Note how in connection with FIG. 2, the rows of undulations show through the pattern.

FIG. 4 shows some of the forces involved when these screens are subjected to compression and note how the forces would be transmitted from one undulation 11 through the cross member 13 to the other undulation 12 projecting in the opposite direction so that the member will provide some springiness but will resist the compression and local deformation. At the same time, however, because of the large amount of metal removed from the neutral axis, the screen will have a fairly good bending ability for the amount of metal involved and the reinforcement between the metals is fairly good though the manipulative processes of making this are quite simple.

Of course, it will be realized that all that is required to manufacture the screen is to take long slot screen wire and bend it as in a press brake or by other means, such as by die-forming techniques, superimpose the two screens 11 and 12 one over the other and pass the undulating wires of the long slot through a corresponding long slot in the opposed screen and securing the screens together, generally at the intersection of long slots with the longitudinal wires, possibly by means of an insert member of metal or other material, inserted into and between the intersecting undulating portions of the screen.

This combination produces two surfaces which are undulated, an outer surface representing the plane generally through which one set of undulations will pass and an oppositely disposed surface representing the other portion where said undulating surface will pass. The general conformation of these undulations may change as was indicated earlier. In between these, there is a third surface representing the points of contact where the undulations intersect, generally at the intersection with a cross strand which prevents longitudinal movements of the cross strands if they are firmly attached to the longitudinal strands. These strands, then, may be fastened by some means at these intersections and this provides three planes, in effect, which are one intersecting plane and a pair of outer surfaces. The connected geometric sections formed by the intersecting longitudinal strands preferably are symmetrical about the intersecting plane A, as shown in FIG. 1, and are symmetrical about other planes B drawn perpendicular to the intersecting plane midway between the intersections or section connections.

Figure 10:
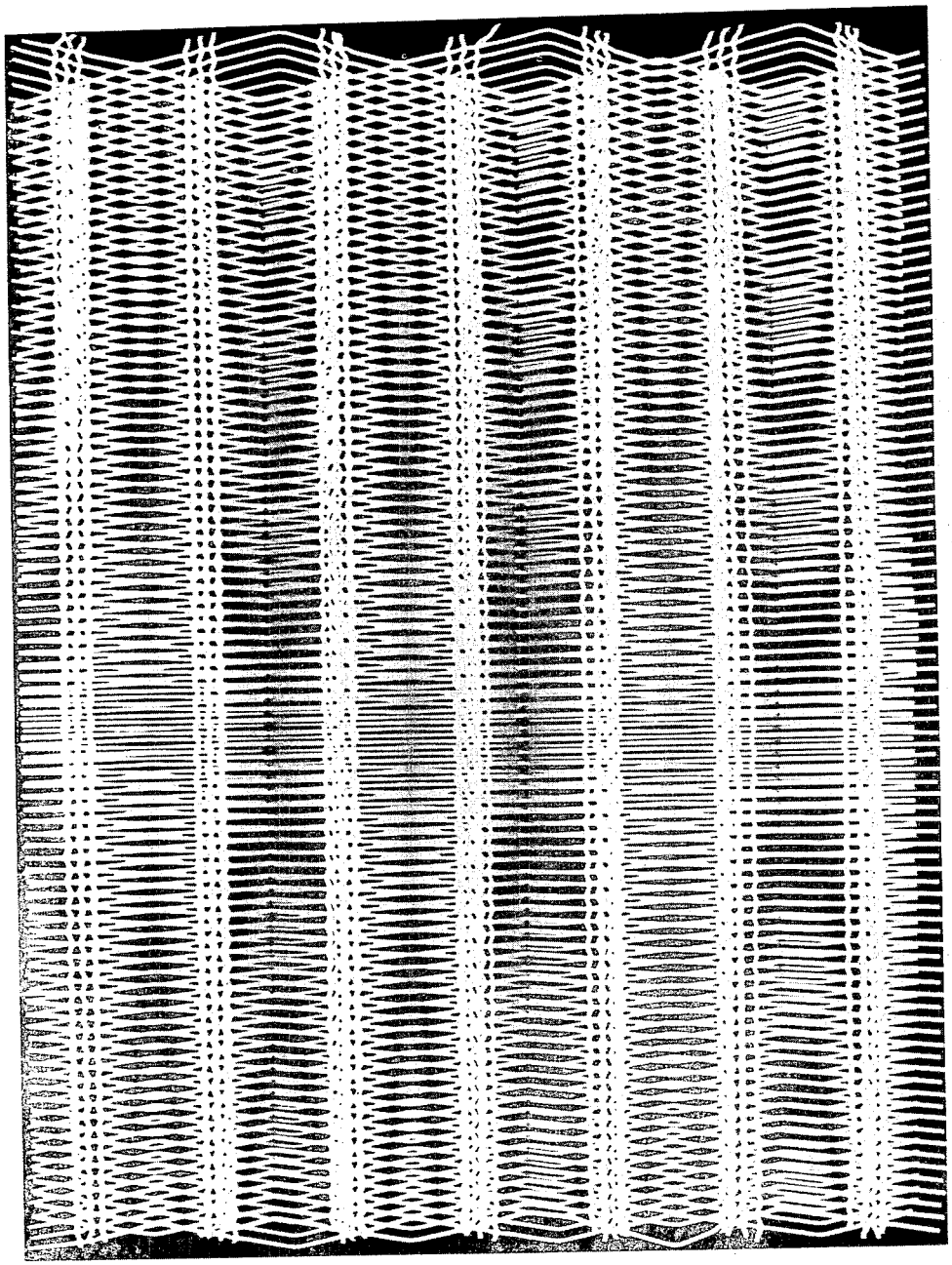
FIG. 10 shows a diagrammatic view of a section of one of said panels showing the light transmitting characteristics.

FIG. 10 shows a diagrammatic illustration of the manner in which the strands 10, spaced from one another, show through much in the manner of a "Lunimeter" in that with light behind the screen, the undulations from the screen are in effect in two different planes and the screens 11 and 12 in these two different planes are substantially parallel to one another. The surfaces of the screens have portions which are other than parallel and produce distortions which are attractive. Because of the visual impression, light appears through the screens in a series of chevrons and they will be bowed chevrons or sharp chevrons depending upon the curvature in the section, whether round or square from the shape of the undulation in the screen.

These chevron-shaped shadows or interference patterns as in the manner of a "Lunimeter" will shift depending upon the angle at which one is looking at the screens and as one walks underneath a section of this screen, the chevrons seem to move back and forth across the screen. This is an attractive pattern and is produced by a relatively simple construction. The explanation of this phenoma may be quite complex and various approaches have been taken. Suffice it to say, that an interesting pattern is produced by this combination which has interesting light diffusing characteristics.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A screen device having a first screen involving a surface having a multiplicity of individual longitudinal wire strands intersected at extended intervals by a plurality of cross strands, the latter being closely adjacent to one another, forming a multiplicity of long slots of uniform width between the longitudinal strands, said first screen being undulated in an alternating pattern with said long slots being bowed outwardly on the sides of the screen, a second screen formed in substantially the same manner, the transverse spacing of said longitudinal wires corresponding with that of the first screen, said screens being formed in an intersecting manner with the long slots of the other screen and the cross strands being substantially in contact with one another.

2. The screen device of claim 1 in which the two screens are fastened together as by means of welding.

3. The screen device of claim 1 in which the screens are secured together by means of additional transverse members, secured between the undulations of the screens.

4. The screen device of claim 1 in which the cross strands are formed with not less than two cross strands grouped together alternating with respect to the longitudinal strands and securely fastened to the longitudinal strands to prevent substantial longitudinal movement of the longitudinal strands under deformation.

References Cited by the Examiner

UNITED STATES PATENTS

| | | | |
|---|---|---|---|
| 420,985 | 2/90 | Benedict | 245—1.5 |
| 1,943,446 | 1/34 | Land | 245—2 |
| 1,974,750 | 9/34 | Preston | 140—3 |
| 2,124,799 | 7/38 | Specht | 50—506 |
| 2,148,698 | 2/39 | Lachman | 50—506 |
| 2,304,990 | 12/42 | Ewing | 245—2 |
| 2,628,642 | 2/53 | Stockton | 140—3 |

FOREIGN PATENTS 308,509　10/55　Switzerland.

CHARLES W. LANHAM, *Primary Examiner.*

NEDWIN BERGER, *Examiner.*